(12) United States Patent
Ichikawa (10) Patent No.: US 8,944,938 B2
(45) Date of Patent: Feb. 3, 2015

(54) GOLF BALL HAVING A RESILIENT MATERIAL

(75) Inventor: Yasushi Ichikawa, Tualatin, OR (US)

(73) Assignee: NIKE, Inc., Beaverton, OR (US)

( * ) Notice: Subject to any disclaimer, the term of this patent is extended or adjusted under 35 U.S.C. 154(b) by 637 days.

(21) Appl. No.: 13/193,025

(22) Filed: Jul. 28, 2011

(65) Prior Publication Data

US 2013/0029784 A1 Jan. 31, 2013

(51) Int. Cl.
*A63B 37/06* (2006.01)
*A63B 37/00* (2006.01)
*A63B 45/00* (2006.01)
*B29C 47/00* (2006.01)
*B29C 47/92* (2006.01)

(52) U.S. Cl.
CPC ......... *A63B 37/0095* (2013.01); *A63B 37/0031* (2013.01); *A63B 37/0043* (2013.01); *A63B 37/0062* (2013.01); *A63B 37/0094* (2013.01); *A63B 45/00* (2013.01); *B29C 47/0004* (2013.01); *B29C 47/0011* (2013.01); *B29C 47/92* (2013.01); *A63B 37/0003* (2013.01); *A63B 37/0058* (2013.01); *A63B 37/0075* (2013.01); *A63B 37/0076* (2013.01); *A63B 37/0092* (2013.01); *B29C 2947/92209* (2013.01); *B29C 2947/92704* (2013.01)
USPC ......... 473/377; 473/376; 473/378; 264/279.1

(58) Field of Classification Search
USPC ............... 473/370, 371, 374, 376, 377, 378; 264/236, 279, 279.1
See application file for complete search history.

(56) References Cited

U.S. PATENT DOCUMENTS

| | | | |
|---|---|---|---|
| 6,290,611 B1 | 9/2001 | Rajagopalan et al. | |
| 6,642,347 B1* | 11/2003 | Baek et al. | 528/310 |
| 6,924,347 B2 | 8/2005 | Morgan et al. | |
| 6,935,970 B2 | 8/2005 | Matroni et al. | |
| 7,153,926 B2 | 12/2006 | Isogawa et al. | |
| 8,696,494 B1* | 4/2014 | Parnell | 473/378 |
| 2002/0049099 A1 | 4/2002 | Peter | |
| 2003/0236137 A1* | 12/2003 | Morgan et al. | 473/377 |
| 2004/0220375 A1* | 11/2004 | Wu | 528/271 |
| 2006/0199938 A1* | 9/2006 | Rajagopalan et al. | 528/76 |
| 2007/0040297 A1* | 2/2007 | Melanson | 264/236 |
| 2007/0093317 A1 | 4/2007 | Wu et al. | |
| 2007/0142127 A1* | 6/2007 | Tarao | 473/371 |
| 2010/0330285 A1 | 12/2010 | Melanson | |

FOREIGN PATENT DOCUMENTS

WO WO2010040944 4/2010

OTHER PUBLICATIONS

Hyper branch polymers—polyglycerol.*

(Continued)

*Primary Examiner* — Gene Kim
*Assistant Examiner* — John E Simms, Jr.
(74) *Attorney, Agent, or Firm* — Honigman Miller Schwartz and Cohen LLP; Anna M. Budde; Jonathan P. O'Brien (57) ABSTRACT

A rebound resilient golf ball having one or more core layers, a cover surrounding the core layer or layers, and optionally a mantle layer positioned between the cover and the core layer or layers. At least one of the layers of the golf ball includes a material whose resilience increases as the hardness of the material increases.

9 Claims, 6 Drawing Sheets

(56) References Cited

OTHER PUBLICATIONS

Partial European Search Report for European Patent Application No. EP11172094.2 mailed on Jan. 31, 2012.
Nonlinear Polymers, http://pslc.ws/mactest/nonlin.htm, last accessed on Mar. 26, 2013.
Notification of Grant of Patent Right for Utility Model issued on Mar. 20, 2012 for Chinese Utility Model Patent Application No. 201120232594.0.
Extended European Search Report mailed May 30, 2012 for European Patent Application No. 11172094.2.
Communication pursuant to Rules 70(2) and 70a(2) EPC and reference to Rule 39(1) EPC mailed on Jul. 2, 2012 for European Patent Application No. 111720.
Response to the Communication pursuant to Rules 70(2) and 70a(2) EPC as filed on Dec. 6, 2012 for European Patent Application No. 11172094.2.
Dendritic polymers, http://www-isis.u-strasbg.fr/cellphysics/Seminary21.02.2011.html, last accessed on Mar. 26, 2013.
Use of Nanoparticles in Soil-Water Bioremediation Processes, http://www.scielo.cl/scielo.php?script=sci_arttext&pid-S0718-2791200800000007&Ing=en&nrm=sio&ignore=.html, last accessed on Mar. 26, 2013.
International search Report mailed Feb. 28, 2013 for PCT Application No. PCT/US2012/046885.

* cited by examiner

GOLF BALL HAVING A RESILIENT MATERIAL

The present invention relates generally to rebound resilient golf balls comprising an core layer or layers having one or more cores, a scuff resistant cover comprising a thermoplastic polyurethane surrounding the core layer or layers, and optionally a mantle layer between the cover and the core layer or layers.

Golf balls have undergone significant changes over the years. For example, rubber cores have gradually replaced wound cores because of consistent quality and performance benefits such as reducing of driver spin for longer distance. Other significant changes have also occurred in the cover and dimple patterns on the golf ball.

The design and technology of golf balls has advanced to the point that the United States Golf Association ("USGA) has instituted a rule prohibiting the use of any golf ball in a USGA-sanctioned event that can achieve an initial velocity of 250 ft/s, when struck by a driver having a velocity of 130 ft/s (referred to hereafter as "the USGA test".) (The Royal and Ancient Club St. Andrews ("R&A") has instituted a similar rule for R&A-sanctioned events.) Manufacturers place a great deal of emphasis on producing golf balls that consistently achieve the highest possible velocity in the USGA test without exceeding the limit. Even so, golf balls are available with a range of different properties and characteristics, such as velocity, spin, and compression. Thus, a variety of different balls may be available to meet the needs and desires of a wide range of golfers.

Regardless of construction, many players often seek a golf ball that delivers maximum distance. Balls of this nature obviously require a high initial velocity upon impact. As a result, golf ball manufacturers are continually searching for new ways in which to provide golf balls that deliver the maximum performance for golfers at all skill levels, and seek to discover compositions that allow a lower compression ball to provide the performance generally associated with a high compression ball.

Balls having a solid construction are generally most popular with the average recreational golfer because they provide a very durable ball while also providing maximum distance. Solid balls may comprise a single solid core, often made of cross-linked rubber such as polybutadiene which may be chemically cross-linked with zinc diacrylate and/or similar cross-linking agents, and then encased within a cover material, such as SURLYN® (the trademark for an ionomer resin produced by DuPont) to provide, a tough, cut-proof blended cover, often referred to as a "two-piece" golf ball.

Such a combination a single solid core and a cut-proof cover may impart a high initial velocity to such two-piece golf balls that results in improved distance. But the materials used in such two-piece golf balls may be very rigid. As a result, two-piece balls may, depending upon the construction, have a hard "feel" when struck with a club. Likewise, due to their hardness, these two-piece balls may have a relatively low spin rate, which, while providing greater distance, may sometimes be more difficult to control, for example, when hitting an approach shot to the green.

SUMMARY

In a first aspect, the invention provides a method of manufacturing a golf ball comprising forming a core layer, wherein the core layer is made from a first material; forming a mantle layer, wherein the mantle layer substantially surrounds the core layer, and wherein the mantle layer is made from a second material; forming a cover layer, wherein the cover layer substantially surrounds the core layer, and wherein the cover layer is made from a third material; wherein at least one of the first material, the second material, and the third material comprises a resilient material, wherein the resilient material has a resilience value and a hardness value, and wherein the resilience value increases as the hardness value increases.

In a second aspect, the invention provides a process of manufacturing a golf ball comprising molding a first layer; molding a second layer, wherein the second layer is molded over the first layer so that the second layer substantially surrounds the first layer; and incorporating a material in at least one of the first layer and the second layer, wherein the material has a resilience and a hardness, and wherein the resilience increases as the hardness increases.

In a third aspect, the invention provides a solid golf ball comprising a first layer; a second layer configured to substantially surround the first layer; and wherein at least one of the first layer and the second layer comprises a resilient material, wherein the resilient material has a resilience and a hardness, and wherein the resilience increases as the hardness increases.

Other changes, modifications, features, benefits, and advantages of the aspects of the invention will be, or will become, apparent to one of ordinary skill in the art upon examination of the following figures and detailed description. It is intended that all such changes, modifications, features, benefits, and advantages be included within this description and this summary, be within the scope of the invention, and be protected, as defined by the appended claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The golf balls according to the invention are provided with a cover material including a thermoplastic polyurethane material containing an isocyanate monomer and a hyper branched polyol having a hydroxyl valence of from about 2.1 to about 36 (which cover material is referred to hereinafter as "dendritic TPU"). This cover material is advantageous in providing, among other attributes, increased scuff resistance as discussed in greater detail below.

More recently, multi-layer golf balls have been made with layers of thermoplastic material such as ionomer materials. In such multi-layer balls, thinner layers of different materials may be fused together to add additional features such as lower spin for tee shots, but with increased spin for approach shots to the green. For example, one of the layers may be a hard ionomer resin in a mantle layer while a softer elastomer material forms the layer adjacent the outer cover. Thinner layers of ionomer resin may be used because the ionomer resin may have a relatively lower resilience, particularly when compared to elastomer materials that may be used to form the core, or various portions of the core.

Highly neutralized ionomers, such as those developed by DuPont®, have resilience comparable to, or even better than, the resilience of other elastomer materials. These highly neutralized ionomers may represent the next step in the innovation for golf ball cores. Golf ball cores made of a thermoplastic material may also be more consistent in quality than, for example, a thermoset elastomeric rubber core, such as cross-linked polybutadiene. Similarly, more elastic thermoplastic materials, such as thermoplastic polyurethane may be used in place of harder, less elastic cross-linked ionomer resins (e.g., SURLYN®) in the cover of the golf ball to achieve a softer feel which is more conducive to imparting spin to the golf ball and thus control in flight and on landing.

Combining a greater COR (greater rebound resilience) of a golf ball with improved scuff resistance in the cover of the golf ball remains a challenge. By making the cover of the golf ball softer (thus imparting greater spin and greater control, as well as greater rebound resilience), the tendency is to make the cover more prone to cutting, scuffing, abrasion, wear, etc. This is particularly true of "square-grooved" club heads which tend to shave or cut the cover of the golf ball more easily than other common groove shapes. Rebound resilience of the golf ball may also be affected by the construction of the various cores and layers within the golf ball, which may also affect rebound resilience, as well as spin control. In fact, there may be competing needs or desires of imparting less or lower spin to the golf ball on longer shots, such as driver shots, while imparting higher or greater spin to the golf ball on approach shots or shots played into the wind.

Definitions

It is advantageous to define several terms before describing the invention. It should be appreciated that the following definitions are used throughout this application.

Where the definition of terms departs from the commonly used meaning of the term, applicant intends to utilize the definitions provided below, unless specifically indicated.

For the purposes of this disclosure, the term "golf ball" refers to any generally spherically shaped ball which may be used in playing the game of golf.

For the purposes of this disclosure, the term "core" normally refers to those portions of a golf ball which are closer to or proximate the center of the golf ball. The core may have multiple layers, where the centermost portion of the golf ball is the "core" or "inner core" and any surrounding core layers are "outer core" layers.

For the purposes of this disclosure, the term "mantle" generally refers to an optional layer or layers of a golf ball which may be positioned between the core layer or layers and the outermost cover, and which may be proximate or adjacent to the cover.

For the purposes of this disclosure, the term "cover" generally refers to the outermost layer of a golf ball, which often has a pattern of dimples (dimple pattern) on the outer surface thereof.

For the purposes of this disclosure, the term "dimple" refers to an indentation in or a protrusion from the outer surface of a golf ball cover that is used to control the flight of the golf ball. Dimples may be hemispherical (i.e., half of a sphere) or semi-hemispherical (i.e., a part or portion of a hemisphere) in shape, including various combinations of hemispherical and semi-hemispherical dimples, but may also be elliptical-shaped, square-shaped, polygonal-shaped, such as hexagonal-shaped, etc. Dimples which are more semi-hemispherical in shape may be referred to as being "shallower" dimples, while dimples which are more hemispherical in shape may be referred to as being "deeper" dimples.

For the purposes of this disclosure, the term "dimple pattern" refers to an arrangement of a plurality of dimples on the outer surface of the cover of a golf ball. The dimple pattern may comprise dimples having the same shape, different shapes, different arrangements of dimples within the pattern (both as to shape and/or size), repeating subpatterns (i.e. a smaller pattern of dimples arranged within the dimple pattern), such as spherical triangular, etc. In some embodiments, the total number of dimples in the dimple pattern may be in the range of from about 250 to about 500, for example, from about 300 to about 400. The total number dimples in the dimple pattern is often an even number (e.g., 336 or 384 dimples), but may also be an odd number (e.g., 333 dimples).

For the purposes of this disclosure, the term "total dimple volume" refers to the aggregate, total, combined, etc., volume of all dimples comprising the dimple pattern.

For the purposes of this disclosure, the term "thermoplastic" refers to the conventional meaning of the term thermoplastic, i.e., a composition, compound, material, medium, substance, etc., which exhibits the property of a material, such as a high polymer, that softens when exposed to heat and generally returns to its original condition when cooled to room temperature (e.g., at from about 20° to about 25° C.

For the purposes of this disclosure, the term "thermoset" refers to the conventional meaning of the term thermoset, i.e., a composition, compound, material, medium, substance, etc., that is cross-linked such that it does not have a melting temperature, and cannot be dissolved in a solvent, but which may be swelled by a solvent.

For the purposes of this disclosure, the term "polymer" refers to a molecule having more than 30 monomer units, and which may be formed or result from the polymerization of one or more monomers or oligomers.

For the purposes of this disclosure, the term "oligomer" refers to a molecule having 2 to 30 monomer units.

For the purposes of this disclosure, the term "monomer" refers to a molecule having one or more functional groups and which is capable of forming an oligomer and/or polymer.

For the purposes of this disclosure, the term "ionomer" refers to a monomer having at least one carboxylic acid group, and which may be at least partially or completely neutralized by one or more bases (including mixtures of bases) to provide carboxylic acid salt monomers (or mixtures of carboxylic acid salt monomers). For example, the ionomer may comprise a mixture of carboxylic acid sodium and zinc salts monomers, such as the mixed ionomer used in making the ionomer resin sold under DuPont's trademark SURLYN® for cut-resistant golf ball covers.

For the purposes of this disclosure, the term "ionomer resin" refers to an oligomer or polymer which may comprise, or be formed, from one or more ionomer units or ionomers, and which may be a copolymer of one or more ionomers (such as methacrylic acid which is at least partially or completely neutralized) and one or more monomers or oligomers which is not an ionomer, such as, for example, ethylene.

For the purposes of this disclosure, the term highly neutralized polymer refers to polymers whose charge has been mostly countered by the addition of a counter-ion material. Highly neutralized polymers may have a charge dissipation of 95% or greater.

For the purposes of this disclosure, the term "elastomer" refers to oligomers or polymers having the property of elasticity, and may be used interchangeably with the term "rubber" herein.

For the purposes of this disclosure, the term "polyisocyanate" refers to an organic molecule having two or more isocyanate functional groups (e.g., a diisocyanate). Polyisocyanates useful herein may be aliphatic or aromatic, or a combination of aromatic and aliphatic, and may include, but are not limited to, diphenyl methane diisocyanate (MDI), toluene diisocyanate (TDI), hexamethylene diisocyanate (HDI), dicyclohexylmethane diisocyanate ($H_{12}$MDI), isoprene diisocyanate (IPDI), etc.

For the purposes of this disclosure, the term "polyol" refers to an organic molecule having two or more hydroxy functional groups.

For the purposes of this disclosure, the term "polyurethane" refers to a polymer which is joined by urethane (carbamate) links, and which may be prepared, for example, from polyols (or compounds forming polyols such as by ring-opening mechanisms, e.g., epoxides) and polyisocyanates. Polyurethanes useful herein may be thermoplastic or thermosetting, but are thermoplastic when used in the cover. The soft segment of a thermoplastic polyurethane may also be partially cross-linked, for example, with a hyper branched or dendritic polyol, to provide improved scuff resistance, increased hardness, etc.

For the purposes of this disclosure, the term "dendritic molecule" refers to a molecule which is a repeatedly branched (also referred to as "hyper branched"), which is often highly symmetrical in structure, and which may include monomers, oligomers, and/or polymers.

For the purposes of this disclosure, the terms "hyper branched polyol" or "dendritic polyol" refer interchangeably to dendritic molecules (monomers, oligomers, and/or polymers) which are repeatedly branched (hyper branched) and have a plurality of hydroxy functional groups (e.g., functional groups which comprise one or more hydroxy groups). "Hyper branched polyols" or "dendritic polyols" may include polyester polyols, polyether polyols, polycarbonate diols, etc. For example, the polyester polyols may be "star-type" comprising a central polyol moiety derived from a diol having one or more hydroxy alkyl chains such as 2-hydroxymethyl-2-methyl-1,3-propanediol, with the polyol ester branches formed from one or more polyhydroxycarboxylic acids or derivatives thereof, such as bis-2-hydroxymethyl-propanoic acid.

For the purposes of this disclosure, the term "hydroxy valence" with reference to the terms "hyper branched polyol" and "dendritic polyol" refers to how many reactive hydroxy groups (or equivalents of hydroxy groups) are present in the molecule. For example, a hyper branched polyol having a hydroxy valence of from about 2.1 to about 36 means a polyol (or a mixture of polyols) having, on average, from about 2.1 to about 36 reactive hydroxy groups.

For the purposes of this disclosure, the term "other polyols" refers to polyols other than "hyper branched polyols" or "dendritic polyols." These other polyols may include diols, triols, etc., polyester polyols, polyether polyols, polycarbonate diols, etc. For example, these other polyols may include "bio-renewable" polyether polyols (i.e., those polyether polyols which have reduced impact on the environment during processing) such as one or more of polytrimethylene ether glycol, polytetramethylene ether glycol (PTMEG), etc., which have, for example, a hydroxyl value of 11.22 to 224.11 mg KOH/g. These "bio-renewable" polyether polyols, such as polytrimethylene ether glycols, may be derived, obtained, extracted, etc., from bio-renewable resources, such as through a fermentation process of natural corn, rather by a synthetic chemical process.

For the purposes of this disclosure, the term "chain extender" refers to an agent which increases the molecular weight of a lower molecular weight polyurethane to a higher molecular polyurethane. Chain extenders may include one or more diols such as ethylene glycol, diethylene glycol, butane diol, hexane diol, etc.; triols such as trimethylol propane, glycerol, etc.; and polytetramethylene ether glycol, etc.

For the purposes of this disclosure, the terms "scuff resistance" and "wear resistance" (hereafter collectively referred to as "scuff resistance") refer to the ability of the material of the ball to resist marks, tears, removal of surface material, punctures, or the like (collectively referred to as "scuffs") due to impacts with club heads. Scuff resistance is, in one example testing protocol, measured by visual comparison of scuffs on test balls with scuffs graded on a scale ("scuff resistance scale") of 1-5, wherein scuff resistance score of "1" represents a ball having the highest scuff resistance and wherein a scuff resistance score of "5" represents a ball having the lowest scuff resistance. One test protocol for measuring scuff resistance is described below under Scuff Resistance Test Protocol, though other test protocols may be used for determining scuff resistance.

For the purposes of this disclosure, the term "rebound resilience" refers to the material property of rubber or materials formulated to have rubber-like properties, where the rebound resilience is an indication of the hysteretic energy loss that may also be defined by the relationship between the storage modulus of the material and the loss modulus of the material. Rebound resilience is generally expressed as a percentage, where the percentage is inversely proportional to the hysteretic loss. For materials alone, the rebound resilience may be measured using any known method, such as ASTM D7121-05 standard protocol. Rebound resilience of the golf ball system may be measured by the coefficient of restitution (COR) of the material used in a component of the golf ball, by the COR of a separate portion(s) or a separate component(s) of a golf ball (e.g., cores, layers, cover, etc.), or by the COR of the golf ball.

For the purposes of this disclosure, the term "moment of inertia (MOI)" refers to a measure of an object's resistance to changes in its rotation rate, and may be given in units of gcm$^2$. The term MOI also refers interchangeably to the terms "mass moment of inertia" and "angular mass."

For the purposes of this disclosure, the term "coefficient of restitution (COR)" refers to the ratio of velocity of an object before and after an impact. A COR of 1 represents a perfect elastic collision where no energy is lost due to the collision, while a COR of 0 represents a perfect inelastic collision, where all of the energy is dissipated during the collision.

For the purposes of this disclosure, the term "specific gravity (SG)" refers to the conventional meaning of the ratio of the density of a given solid (or liquid) to the density of water at a specific temperature and pressure.

For the purposes of this disclosure, the term "deflection" refers to the degree to which a structural element is displaced under load. The amount of deflection (deflection amount)

may be used as a measure of the ability to compress the golf ball (or a component or components of the golf ball), and thus is a measure of the rebound resilience (i.e., COR).

For the purposes of this disclosure, the term "Shore D hardness" refers to a measure of the hardness of a material by a durometer, and especially the material's resistance to indentation. Shore D hardness may be measured with a durometer directly on the curved surface of the core, layer, cover, etc., according to ASTM method D2240. In other embodiments, the hardness may be measured using standard plaques.

For the purposes of this disclosure, the term "curved surface" refers to that portion of the surface of a golf ball, core layer or layers, core, cover, etc., which is curved and which is used for measuring various properties, characteristics, etc., of the golf ball, core layer or layers, core, cover, etc.

Flying distance may be used as an index to evaluate the performance of a golf ball. Flying distance is affected by three primary factors: "initial velocity", "spin rate", and "launch angle". Initial velocity is one of the primary physical properties affecting the flying distance of the golf ball. The coefficient of restitution (COR) may also be used as an alternate parameter for the initial velocity of the golf ball.

Another index which may be used to measure the performance of a golf ball is spin rate. The spin rate of a ball may be measured in terms of "back spin" and "side spin," as these different types of spin have different impacts on the flight of the ball. The spin of the ball against the direction of flight is known as "back spin". Any spin to the ball that is oriented at an angle to the direction of flight is "side spin". Back spin generally affects the distance of the ball's flight. Side spin generally affects the direction of the ball's flight path.

The spin rate of the golf ball generally refers to the speed that the ball turns about a longitudinal axis through the center of the ball. The spin rate of the ball is often measured in revolutions per minute. Because the spin of the ball generates lift, the spin rate of the ball directly impacts the trajectory of the ball. A shot with a higher spin rate tends to fly to a higher altitude compared to a ball with a lower spin rate. Because the ball tends to fly higher with a higher spin rate, the overall distance traveled by a ball hit with an excessive amount of spin tends to be less than that of a ball hit with an ideal amount of spin. Conversely, a ball hit with an insufficient amount of spin may not generate enough lift to increase the carry distance, thus resulting in a significant loss of distance. Therefore, hitting a ball with the ideal amount of spin may maximize the distance traveled by the ball.

Description

Figure 1:
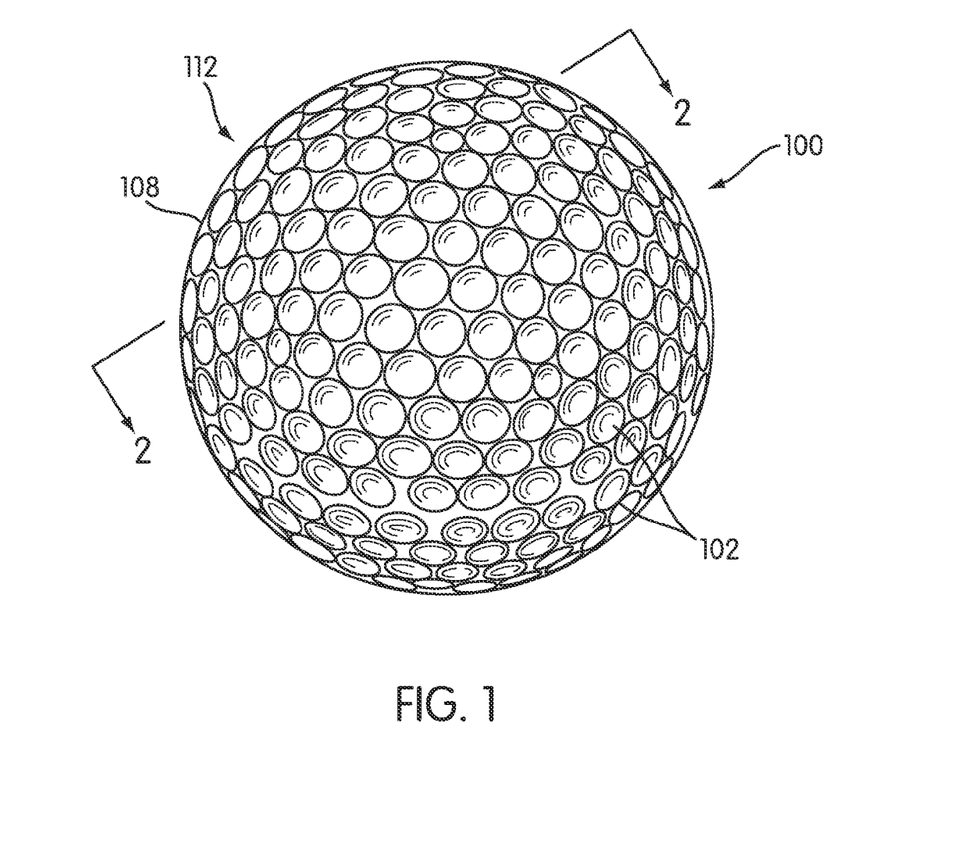
FIG. 1 is a perspective view of a golf ball.

FIG. 1 is a perspective view of a solid golf ball 100 according to an embodiment of the invention. Golf ball 100 may be generally spherical in shape with a plurality of dimples 102 arranged on the outer surface 108 of golf ball 100 in a pattern 112.

Internally, golf ball 100 may be generally constructed as a multilayer solid golf ball, having any desired number of pieces. In other words, multiple layers of material may be fused, blended, or compressed together to form the ball. The physical characteristics of a golf ball may be determined by the combined properties of the core layer(s), any optional mantle layers, and the cover. The physical characteristics of each of these components may be determined by their respective chemical compositions. The majority of components in golf balls comprise oligomers or polymers. The physical properties of oligomers and polymers may be highly dependent on their composition, including the monomer units included, molecular weight, degree of cross-linking, etc. Examples of such properties may include solubility, viscosity, specific gravity (SG), elasticity, hardness (e.g., as measured as Shore D hardness), rebound resilience, scuff resistance, etc. The physical properties of the oligomers and polymers used may also affect the industrial processes used to make the components of the golf ball. For example, where injection molding is the processing method used, extremely viscous materials may slow down the process and thus viscosity may become a limiting step of production.

Figure 2:
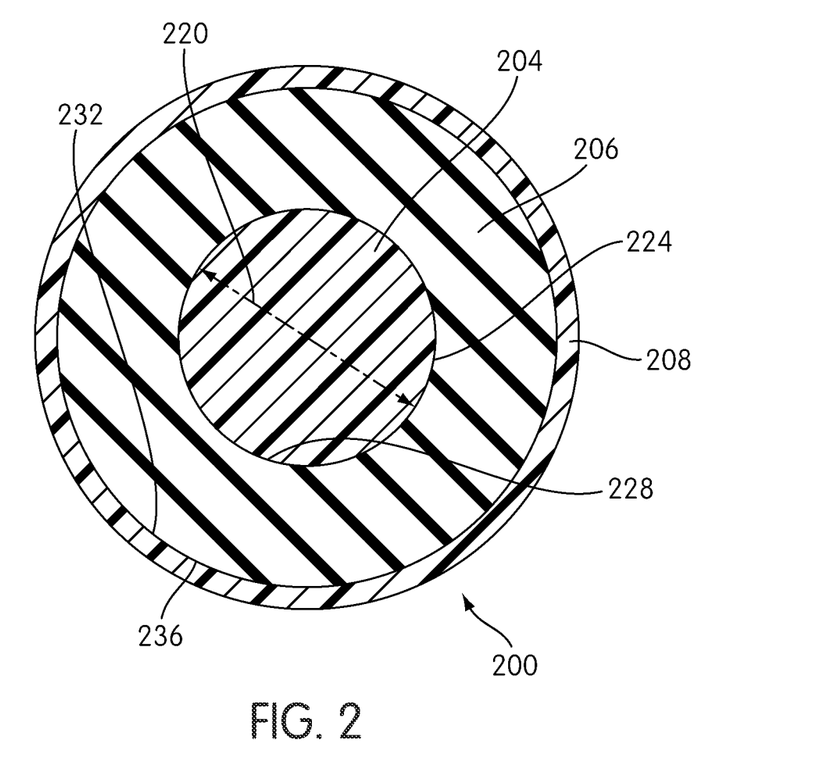
FIG. 2 is a sectional view of an embodiment of a golf ball taken along line 2-2 of FIG. 1.

As shown in FIG. 2, one embodiment of such a golf ball (referred to generally as 200) includes an inner core 204, a cover 208, and an outer core 206 between inner core 204 and cover 208.

Cover 208 surrounds, encloses, encompasses, etc., the core and any other internal layers of the ball. Cover 208 has an outer surface that may include a dimple pattern comprising a plurality of dimples. Cover 208 comprises a dendritic TPU formed from one or more isocyanate monomers, one or more hyper branched polyols having a hydroxy valence of from about 2.1 to about 36, optionally one or more other polyols, and optionally one or more chain extenders. Cover 208 has a relatively higher SG greater than that of the core, such as, in some embodiments, at least about 1.2. Cover 208 can have any thickness, but may, in some embodiments, have a thickness ranging from about 0.5 to about 2 mm, and, in some embodiments from about 1.0 to about 1.5 mm. Cover 208 may have a hardness ranging from about 40 to about 65 on the Shore D scale as measured on the curved outer surface of cover 208. In some embodiments, the hardness may range from about 50 to about 60 on the Shore D scale. Cover 208 may have a relatively higher spin rate.

The dendritic TPUs used in cover 208 include one or more hyper branched/dendritic polyols having hydroxy valence of from about 2.1 to about 36, for example, a hydroxy valence of from about 12 to about 36. When the number of reactive hydroxy groups is less than about 2.1, the ability to at least partially cross-link the resulting thermoplastic may not be achieved such that the scuff resistance of the golf ball cover is reduced. When the number of reactive hydroxy groups is more than about 36, the dispersibility of the resulting dendritic TPU may be poorer, as well as imparting a higher viscosity such that it may be difficult to process the polyurethane when making golf ball covers.

In addition, even when one or more hyper branched/dendritic polyols having a hydroxy valence of from about 2.1 to about 36, for example, a hydroxy valence of from about 12 to about 36, are used, the resulting TPU elastomer has physical properties appropriate for injection and extrusion molding, as well as imparting scuff resistance and at least satisfactory or adequate rebound resilience to the molded golf ball. If such a hyper branched/dendritic polyol is not used in preparing the TPU, the resulting polyurethane may be too soft such that it is difficult to process, with a relatively lower rebound resilience and scuff resistance being imparted to the golf ball cover.

The dendritic TPUs used in various embodiments of cover 208 may also optionally include one or more other polyols, and one or more chain extenders. For example, these dendritic TPUs may be prepared from: (A) from about 30 to about 70 parts (by weight of the total reaction mixture) of one or more bio-renewable polyether polyols; (B) from about 15 to about 60 parts (by weight of the total reaction mixture) of one or more polyisocyanates; (C) from about 0.1 to about 10 parts (by weight of the total reaction mixture) of one or more hyper branched polyols having a hydroxy valence of from an about 2.1 to about 36; and (D) from about 10 to about 40 parts (by weight of the total reaction mixture) of one or more chain extenders. Such a dendritic TPU may be prepared by a process comprising the step of: (1) mixing together, in order, optionally the one or more chain extenders, the one or more polyisocyanates, optionally the one or more other polyols, and the one or more hyper branched polyols having a hydroxy valence of from about 2.1 to about 36.

This process for preparing the dendritic TPUs may also include the following additional steps: (2) curing the mixture from step (1) for a specified time period, in some embodiments from about 1 hour to about 48 hours, at a temperature from about 60 degrees C. to about 140 degrees C.; (3) grinding the products obtained in step (2) at from about 0 degrees C. to about 50 degrees C.; and (4) extruding or injection molding the ground material from step (3) at a temperature in the range of from about 150 degrees C. to about 300 degrees C.

An embodiment of a dendritic TPU useful in cover 208 of embodiments of golf balls of this invention may be prepared as follow: A mixture of bio-renewable polyether polyol (Dupont Cerenol H-200, OH-Value: After 56.11 mgKOH/g) in an amount of 18.8 kg, 1,4-butylene glycol (BASF 1,4-butandiol) in an amount of 3.3 kg, and a hyper branched polyol(HBP) (Perstorp, BOLTORN H-2003) in an amount 0.4 kg is agitated at 60 degrees C. for 3 minutes. Diphenylmethane diisocyanate (MDI) in an amount of 12 kg is injected into this mixture, and is then mixed at a speed of 800 rpm to obtain the polymer. (The hyper branched polyol (Perstorp BOLTORN H-2003) is a material having an Mw 2,300 g/mol (hydroxyl value: 40.0 mgKOH/g) with a 12-hydroxy valence group and comprises a dendrimer (a dendritic polymer that uses Bis-MPA (2,2-dimethyol propionic acid) as the initiator.) The polymer obtained is held at 80 degrees C. for 8 hours and then ground, such that it is prepared in a chip (flake form) form, which is then extruded at 230 degrees C. and molded into a pellet in a ground form. This ground pellet has a Shore D hardness of 45, a tensile strength of 320 kgf/cm$^2$, a tear strength of 110 kgf/cm, an elongation of 400%, and a rebound resilience of 40%.

Another embodiment of a dendritic TPU useful in cover 208s of embodiments of golf balls of this invention may be prepared as follow: A mixture of bio-renewable polyether polyol (BASFPolyTHF-2000, OH-Value; After 56.11 mg KOH/g) in an amount of 18.8 kg, 1,4-butylene glycol (BASF 1,4-butandiol) in an amount of 3.3 kg, and a hyper branch polyol (HBP) (Perstorp, BOLTORN H-2003) in an amount of 0.4 kg is agitated at 60 degrees C. for 3 minutes. Diphenylmethane diisocyanate (MDI) in an amount of 12 kg is injected into this mixture, and is then mixed at a speed of 800 rpm to obtain polymer. (The hyper branched polyol (Perstorp BOLTORN H-2003) is a material having an Mw 2,300 g/mol (hydroxyl value: 40.0 mgKOH/g) with a 12-hydroxy valence group and comprises a dendrimer (dendric polymer that uses Bis-MPA (2,2-dimethyol propionic acid) as the initiator.) The polymer obtained is held at 80 degrees C. for 8 hours and then ground, such that it is prepared in a chip (flake form) form, which is then extruded at 230 degrees C. and molded into a pellet in a ground form. This ground pellet has a Shore D hardness of 45, a tensile strength of 300 kgf/cm$^2$, a tear strength of 100 kgf/cm, an elongation of 400%, and a rebound resilience of 40%.

One advantage of using a dendritic TPU in the cover of a golf ball is improved scuff resistance. In other words, the dendritic TPU cover will be less prone to damage from impacts with a club face than similarly constructed balls having conventional materials in the cover. The scuff resistance may be measured or evaluated using any technique. An example test protocol based upon a visual inspection of the appearance of a ball surface after a predetermined number of hits from a golf club is provided below. Any type of scuff resistance test and measurement scheme may be used to show that the scuff resistance of the TPU material of the cover of the embodiments discussed in this application is greater than the scuff resistance of conventional golf balls. This discussion of the testing protocol is intended as an illustrative example of one way in which the increased scuff resistance of the cover TPU material can be shown. This is not intended to be an exhaustive discussion of scuff resistance evaluation methods or scales. Any scuff resistance test and testing method may be used.

Example Scuff Resistance Test Protocol

Figure 4:
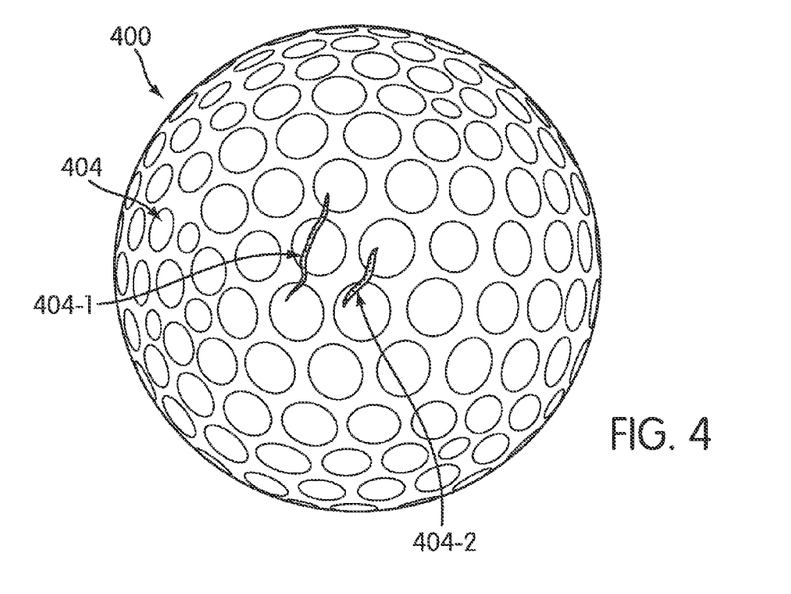
FIG. 4 is a schematic of a golf ball with a cover having the highest scuff resistance or a scuff score of "1"
Figure 5:
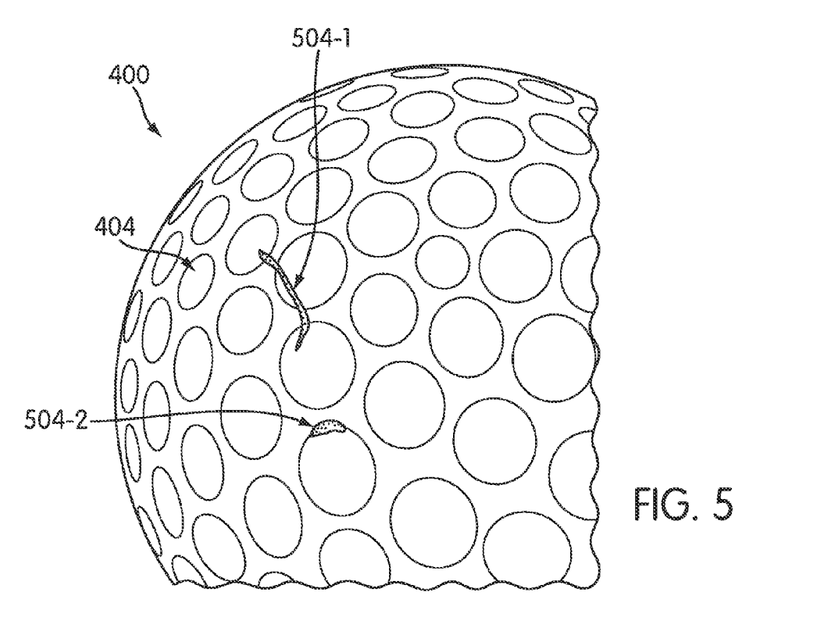
FIG. 5 is an enlarged schematic of the golf ball of FIG. 4.
Figure 6:
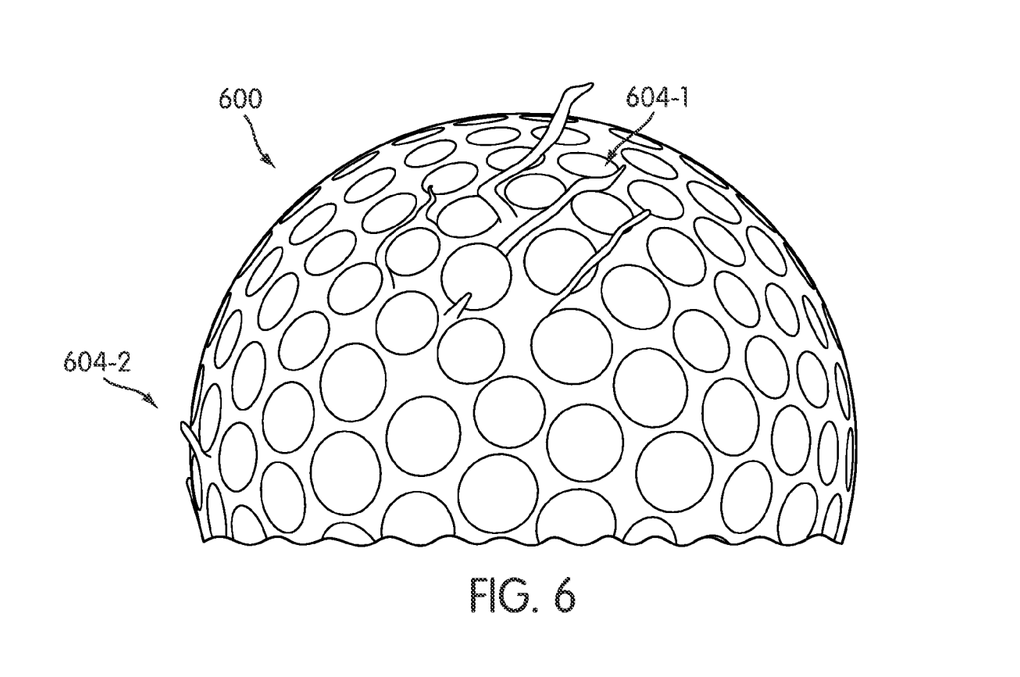
FIG. 6 is a schematic of a golf ball with a cover having the lowest scuff resistance or a scuff score of "5"
Figure 7:
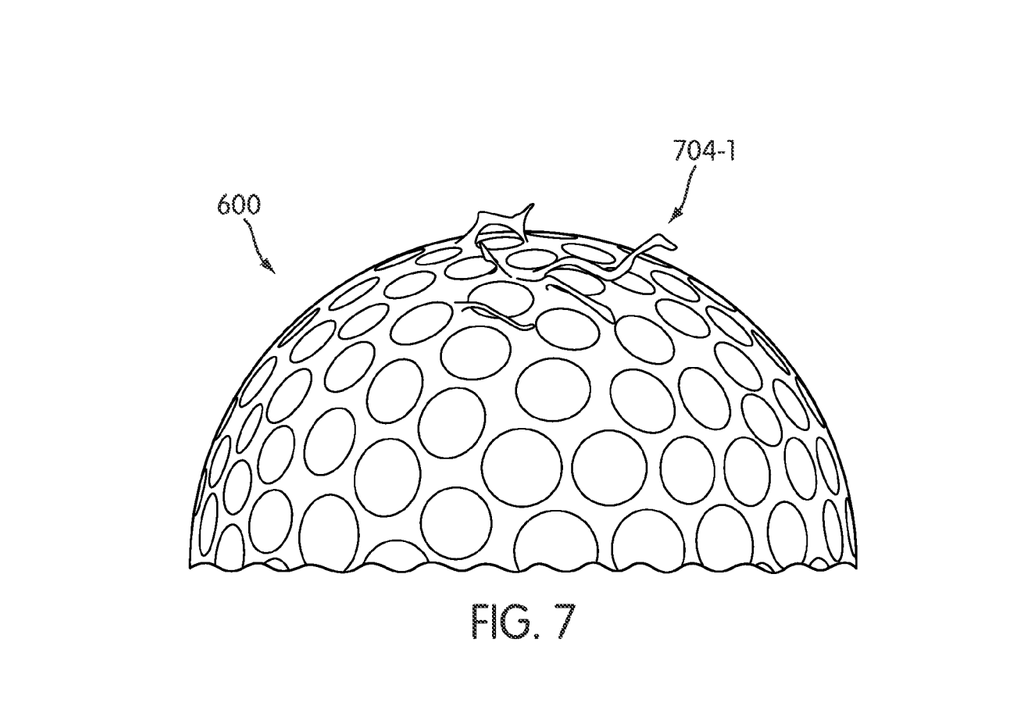
FIG. 7 is a schematic of the golf ball of FIG. 6 but at a different angle.

This exemplary test is designed to measure the scuff resistance of the balls cover based on a visual comparison of the appearance of the cover of the balls tested. Each sample ball is hit in 3 different spots by an aggressively grooved wedge using a golf lab robot (Nike Victory Red forged wedge, approximately 56 degrees (+/−2 degrees), with an initial ball speed of approximately 47-50 mph.) The scuffing properties are evaluated by an evaluator who visually inspects the surface of the ball for damage and rates the sample or tested ball on a scuff scale. The scale may be any type of graded scale desired, with the gradations on the scale predetermined so that the evaluator can readily categorize the amount of damage to the cover of the ball. For the purposes of example only, a scale of 1-5 may be used, where a "1" scuff resistance score represents a ball having the highest scuff resistance, i.e., a ball which is not easily scuffed. See FIGS. 4 and 5 where golf ball 400 has a cover 404 with minimal, if any, deformation, at impact sites indicated as 404-1, 404-2, 504-1, and 504-2. A "5" scuff resistance score represents a ball having the lowest scuff resistance, i.e., a ball which is relatively easily scuffed. See FIGS. 6 and 7 which show a golf ball 600 from two different angles where there is a significant amount of abrasion and peeling at the impact sites indicated as 604-1, 604-2, and 704-1. A score of 2-4 are given to balls falling between these two extremes. A general description of the various scuff resistance levels used in this example test are provided in Table 1.

TABLE 1

Example Scuff Resistance Scale

| Scuff Resistance Score | Score Description |
| --- | --- |
| 1 | Minimal, if any, cover deformation. Impact site is difficult to see. Ridge lines from wedge face only noticeable alteration to cover. |
| 2 | Limited cover deformation/scuffing/material removal, some peeling of cover. |
| 3 | Some cover material scuffing, dimple pattern affected somewhat at impact site. Limited amount of cover material peeling off surface. |
| 4 | Noticeable deformation and abrasion of surface. Fair amount of cover peeling. Dimple pattern somewhat affected at impact site. |
| 5 | Substantial deformation and abrasion of impact site. Cover material peeling and/or missing altogether. Dimple pattern affected significantly. |

In addition to these descriptive terms, the evaluator may be provided with a sample photograph or sample ball with a ball having scuff marks previously evaluated or selected to be at a particular level.

In carrying out the test, the wedge abrasion conditions are loaded into the robot interface. The wedge is then mounted on the robot. Each sample golf ball is hit three times at three separation locations on each sample ball.

Each sample ball is then evaluated based on the 5 point scuff resistance scale shown in Table 3. In other testing schemes, different scales may be used to delineate the differences between various levels of scuff resistance. Any scuff resistance scale will, however, in some way indicate which balls are generally easier to scuff, i.e., have low scuff resistance. Similarly, any scuff resistance scale will also in some way indicate which balls are generally more difficult to scuff, i.e., have high scuff resistance. In other testing regimes, however, multiple balls may be tested and simply compared to each other to determine which ball has higher scuff resistance than the other balls of the test, without using a scale or absolute categorization scheme.

For the purposes of this disclosure, a ball may be considered to have "increased scuff resistance" if the scuff resistance is higher than that of a control ball, a ball of similar construction made with a standard cover material having a similar hardness. Similarly, a ball may be considered to have "decreased scuff resistance" if the scuff resistance is lower than that of a control.

Tests according to this example testing protocol were conducted on balls having a dendritic TPU cover and similarly constructed balls having conventional material covers. The balls with the dendritic TPU cover showed increased scuff resistance over the balls having conventional material covers. This allows a ball to have a relatively soft cover to increase the ability of a golfer to impart spin to the ball while also increasing the durability of the ball.

A golf ball having a cover that includes a dendritic TPU, such as golf ball 100, may include other features. For example, any number of dimples 102 may be provided on surface 108 of golf ball 100. In some embodiments, the number of dimples 102 may be in the range from about 250 to about 500. In other embodiments, the number of dimples 102 may be in the range from about 300 to about 400. As shown in FIG. 1, dimples 102 may be arranged on surface 108 of golf ball 100 in a triangular spherical pattern 112, as well as any other dimple patterns known to those skilled in the art.

Though shown as substantially hemispherical, dimples 102 may have any shape known in the art, such as semi-hemispherical, elliptical, polygonal, such as hexagonal, etc. While in some embodiments dimples 102 may be protrusions extending outwardly from surface 108 of golf ball 100, dimples 102 normally comprise indentations in surface 108 of golf ball 100. Each indentation of each dimple 102 defines a dimple volume. For example, if dimple 112 is a hemispherical indentation in surface 108, the space carved out by dimple 112 and bounded by an imaginary line representing where surface 108 of golf ball 100 would be if no dimple 102 were present has a dimple volume of a hemisphere, or $\frac{2}{3}\pi r^3$, where r is the radius of the hemisphere. In some embodiments, all dimples 102 may have the same or similar diameter or radius. In other embodiments, dimples 102 may be provided with different diameters or radii. In some embodiments, each dimple 102 may have a diameter or radius selected from a preselected group of diameters/radii. In other embodiments, the number of different diameters/radii in the preselected group of diameters/radii may be in the range of from three (3) to six (6). In some embodiments, the number of dimples 102 with the largest diameter/radius may be greater than the number of dimples with any other diameter/radius. In other words, in such an embodiment, there are more of the largest dimples than dimples of any other size. Dimples 102 may also be arranged in repeating subpatterns of dimples 102 which may have recognized geometries (e.g., pentagonal), and may comprise combinations of dimples having smaller and larger diameters/radii.

The aggregate of the volumes of all of dimples 102 on 108 surface of golf ball 100 may be referred to as a "total dimple volume." In one embodiment, the total dimple volume may be in the range of from about 550 to about 800 mm³. In some embodiments, the total dimple volume may in the range of from about 600 to about 800 mm³.

These golf ball embodiments may optionally comprise a mantle layer positioned between cover 208 and the core layer or layers. The mantle layer may comprise an at least partially neutralized thermoplastic ionomer resin or a urethane resin. In some embodiments, the mantle layer may have a specific gravity (SG) greater than that of the outer core. In some embodiments, the mantle may have a thickness of about 0.3 mm to about 3 mm in some embodiments, and a relatively lower spin rate.

Inner core 204 may comprise any number of materials. In some embodiments, inner core 204 may comprise a thermoplastic material or a thermoset material. The thermoplastic material of inner core 204 may be an ionomer resin, a bi-modal ionomer resin, a polyamide resin, a polyester resin, a polyurethane resin, etc., and combinations thereof. In one embodiment, inner core 204 may be formed from an ionomer resin. For example, inner core 204 may be made from a highly neutralized ionomer resin such as HPF or SURLYN®, both commercially available from E. I. Dupont de Nemours and Company, and IOTEK®, which is commercially available from Exxon Corporation. To increase COR, one composition of inner core 204 may include HPF as the main ionomer resin composition with SURLYN® and/or IOTEK® as optional sub-compositions. Any sub-composition of inner core 204 may be in an amount of from 0 to about 10 parts by weight, based on 100 parts by weight of the main ionomer resin composition of inner core 204.

Inner core 204 may be made using any method known in the art, such as hot-press molding, injection molding, compression molding, etc. Inner core 204 may comprise a single layer or multilayer construction, and except for the aforementioned materials, other materials may also be optionally included in inner core 204. In some embodiments, the material of inner core 204 may be selected to provide inner core 204 with a COR greater than about 0.750. In some embodiments, inner core 204 may have a COR at 40 meters per second ranging between about 0.79 and about 0.89. In some embodiments, inner core 204 may have a higher COR than that of golf ball 100 taken as a whole.

In some embodiments, inner core 204 may have a diameter, indicted in FIG. 2 by dashed double-headed arrow 220, in a range between about 19 mm and about 37 mm. In some embodiments, diameter 220 of inner core 204 may be in the range from about 19 mm and about 32 mm. In some embodiments, diameter 220 of inner core 204 may be in the range between about 21 mm and about 35 mm. In some embodiments, diameter 220 of inner core 204 may range between about 23 mm and 32 mm.

In the embodiment shown in FIG. 2, outer core 206 surrounds, covers, encompasses, substantially encloses, etc., inner core 204. Outer core 206 has an interior surface 224 facing an exterior surface 228 of inner core 204. In the embodiment shown in FIG. 2, exterior surface 232 of outer core 206 faces an interior surface 236 of cover 208. Outer core 206 may have any thickness. In one embodiment, the thickness of outer core 206 may be in the range of from about 3 to about 11 mm. In one embodiment, the thickness of outer core 206 may in the range of from about 4 to about 10 mm. Outer core 206 may be formed using any method known in the art, such as compression molding, injection molding, or the like.

Outer core 206 may comprise a thermoset material. In some embodiments, the thermoset material may be a rubber composition. In some embodiments, the base rubber of the rubber composition may include 1,4-cis-polybutadiene, polyisoprene, styrene-butadiene copolymers, natural rubber, and combinations thereof, as well as rubber compositions that have been at least partially cross-linked (e.g., by vulcanization). To increase the resiliency of the core layer or layers, 1,4-cis-polybutadiene may be used as the base rubber of the rubber composition. Alternatively, 1,4-cis-polybutadiene may be used as the base material for outer core 206, with additional materials being added to this base material. In some embodiments, the amount of 1,4-cis-polybutadiene may be at least 50 parts by weight, based on 100 parts by weight of the rubber composition.

Additives, such as a cross-linking agent, a filler with a greater specific gravity, plasticizers, anti-oxidants, etc., may be added to the rubber composition. Suitable cross-linking agents may include peroxides, zinc acrylate, magnesium acrylate, zinc methacrylate, magnesium methacrylate, etc., as well as combinations thereof. To increase the resiliency of the rubber composition, zinc acrylate may be used. However, to increase the resistance to long-term exposure to relatively high ambient temperatures, a peroxide may be used as the cross-linking agent. In particular, when inner core 204 is formed from a highly resilient thermoplastic material, the performance of golf ball 100 is maintained in spite of long-term exposure to relatively high ambient temperatures when outer core 206 is formed from a peroxide cross-linked polybutadiene material.

To increase the specific gravity of outer core 206, a suitable filler may be added in the rubber composition, such as zinc oxide, barium sulfate, calcium carbonate, magnesium carbonate, etc. In addition, a metal powder with a greater specific gravity may also be used as the filler, such as tungsten. By means of adjusting the added amount of the filler, the specific gravity of outer core 206 may be adjusted as desired.

Figure 3:
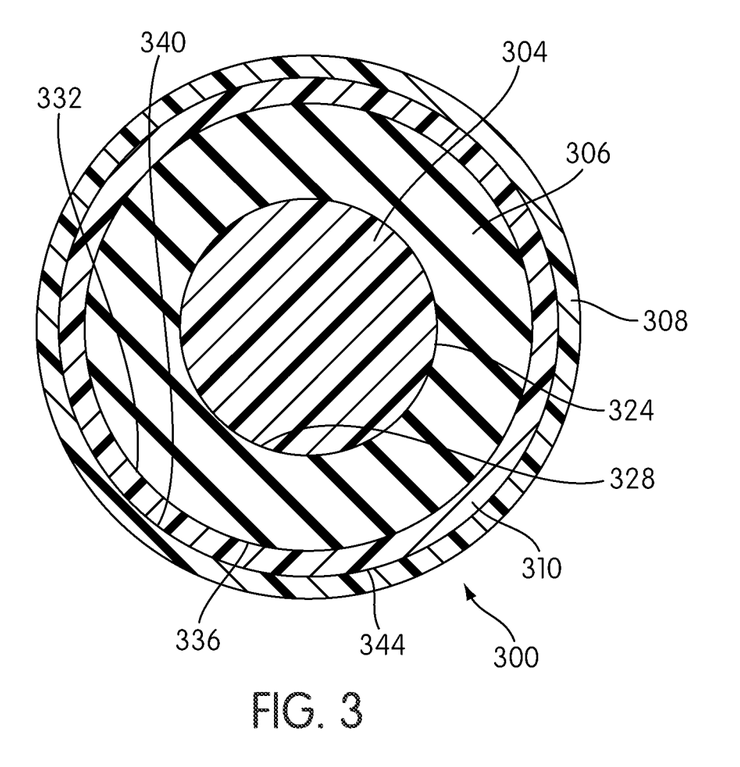
FIG. 3 is a sectional view of another embodiment of a golf ball also taken along line 2-2 of FIG. 1.

In the embodiment shown in FIG. 3, golf ball 300 has inner core 304, outer core 306 and cover 308 which may comprise the same materials, may have the same properties and may have the same diameters/thicknesses as, respectively, inner core 204, outer core 206, and cover 208 of the embodiment shown in FIG. 2. Golf ball 300 of FIG. 3 is also provided with an additional inner cover or mantle layer 310. In such an embodiment, cover 308 may be considered to be an outer cover layer. Mantle layer 310 substantially encloses, etc., outer core 306. Mantle layer 310 may comprise the same material as that of cover 308, or may comprise a different material.

In the embodiment shown in FIG. 3, outer core 306 surrounds, covers, substantially encloses, etc., inner core 304. Outer core 306 has an interior surface 324 facing an exterior surface 328 of inner core 204. In the embodiment shown in FIG. 3, exterior surface 332 of outer core 306 faces an interior surface 336 of mantle layer 310. Mantle layer 310 has an exterior surface 340 that faces interior surface 344 of outer core 306. Mantle layer 310 may be made using any method known in the art, such as by compression molding, injection molding, or the like.

The thickness of mantle layer 310 may be in the range of between about 1 mm and 11 mm. In some embodiments, the thickness of mantle layer 310 may be in the range of between about 1.2 mm and about 8.5 mm. In some embodiments, the thickness of mantle layer 310 may be in the range of between about 1.5 mm and about 3 mm.

In some embodiments, the exterior surface of mantle layer 310 has a higher hardness than the exterior surface of cover 308. In some embodiments, an exterior surface of mantle layer 310 may have a Shore D hardness of from about 45 to about 65, while the exterior surface of outer cover layer 108 may have a Shore D hardness of from about 40 to about 60. In some embodiments, the entirety of mantle layer 310 has a higher hardness than the entirety of cover 308.

In Table 2, the composition and properties the components (inner core, outer core, optional mantle layer, and cover) for various golf balls are illustrated. Example balls 1 and 2 are made according to the two embodiments of the invention shown in FIGS. 3 and 2, respectively. In Examples 1 and 2, respective inner cores 204/304 may be made from HPF2000, a DuPont ionomer resin in which the methyl methacrylate (MAA) acid groups have been fully neutralized with magnesium ions; in Example 1, inner core 204 may also include a barium sulfate filler. Respective outer cores 206/306 may be made from BR compound, a peroxide cross-linked polybutadiene material. Covers 208/308 of each of the golf balls of Examples 1 and 2 may be made from a scuff-resistant thermoplastic polyurethane (TPU) material, as previously described (designated as Neothane TEI4511D and Neothane TEI6025D in Table 2.) For the golf ball of Example 2, mantle layer 310 also comprises the combination of HPF2000 and barium sulfate like inner core 306. Comparative Example 1 is a 4-piece ball having a similar construction to Example 1, but provided with a cover made of a conventional TPU material. Similarly, Comparative Example 2 is a 3-piece ball having a similar construction to Example 2, but is provided with a cover made of a conventional TPU material.

TABLE 2

Golf Ball Compositions and Properties

| | | Example 1 4P | Example 2 3P | Comparative Example 4P | Comparative Example 3P |
|---|---|---|---|---|---|
| Material Formulation | | | | | |
| Center core | HPF 2000 | 87.5 | 85 | 87.5 | 85 |
| | HPF AD1035 | | 15 | | 15 |
| | BaSO4 M/B | 12.5 | 0 | 12.5 | 0 |
| Outer core | TAIPOL ™ BR0150 | 100 | 100 | 100 | 100 |
| | Zinc acrylate | 35 | 34 | 35 | 34 |
| | Zinc oxide | 7 | 7 | 7 | 7 |
| | Barium sulfate | 0 | 10 | 0 | 10 |
| | Peroxide | 1.1 | 1.1 | 1.1 | 1.1 |
| Mantle | HPF2000 | 40 | | 40 | |
| | Surlyn8945 | 20 | | 20 | |
| | BaSO4 M/B | 40 | | 40 | |
| Cover | Neothane TEI4511 | 100 | | | |
| | Neothane TEI6025D | | 100 | | |
| | Texin 245 | | | 100 | |
| | Texin 260 | | | | 100 |

TABLE 2-continued

| | | Example 1 4P | Example 2 3P | Comparative 1 Example 4P | Comparative 2 Example 3P |
|---|---|---|---|---|---|
| | Color M/B | 4% | 4% | 4% | 4% |
| | Static Specification | | | | |
| Center core | Shore D | 55 | 54 | 55 | 54 |
| | S.G. | 0.999 | 0.970 | 0.999 | 0.970 |
| | Diameter (mm) | 28 | 24 | 28 | 24 |
| | 10-130 kg (mm) | 2.95 | 3.65 | 2.95 | 3.65 |
| Outer core | Shore D | 60 | 60 | 60 | 60 |
| | S.G. | 1.085 | 1.145 | 1.085 | 1.145 |
| | Diameter (mm) | 39.3 | 40.4 | 39.3 | 40.4 |
| | 10-130 kg (mm) | 2.75 | 2.86 | 2.75 | 2.86 |
| Mantle | Shore D | 59 | | 59 | |
| | S.G. | 1.039 | | 1.039 | |
| | Thickness (mm) | 2.2 | | 2.2 | |
| Ball (Cover) | Shore D | 55 | 61 | 55 | 61 |
| | S.G. | 1.117 | 1.150 | 1.117 | 1.150 |
| | Diameter (mm) | 42.70 | 42.70 | 42.70 | 42.70 |
| | Thickness (mm) | 1.2 | 1.2 | 1.2 | 1.2 |
| | Weight (g) | 45.6 | 45.6 | 45.6 | 45.6 |
| | PGA Comp | 94 | 85 | 94 | 85 |
| | 10-130 kg (mm) | 2.49 | 2.83 | 2.50 | 2.80 |
| | COR | 0.7999 | 0.7990 | 0.7890 | 0.7800 |
| | Performance Characteristic | | | | |
| Launch data/Driver | Initial Velocity (mph) | 182 | 181 | 179 | 177 |
| | Launch Angle (deg) | 5.7 | 6.3 | 5.6 | 6.2 |
| | Spin (rpm) | 3000 | 2930 | 3400 | 3250 |
| | Carry (yds) | 274.9 | 274.7 | 269.2 | 267.2 |
| | Total (yds) | 293.0 | 293.0 | 285.2 | 283.8 |
| Launch data/Wedge | Initial Velocity (mph) | 47 | 46 | 47 | 46 |
| | Launch Angle (deg) | 30.4 | 33.3 | 30.0 | 33.0 |
| | Spin (rpm) | 7360 | 6830 | 7150 | 6600 |
| Durability | Scuff test | 1.5 | 2.0 | 3.5 | 4.0 |
| | COR durability | 150+ | 150+ | 150+ | 150+ |

By reviewing the Performance Characteristics in Table 2, it will be appreciated that Examples 1 and 2, made according to embodiments of the invention, show superior durability in terms of scuff resistance over Comparative Examples 1 and 2, similar balls made with covers of conventional TPU material. Additionally, Examples 1 and 2 show improved spin characteristics over Comparative Examples 1 and 2.

Also, the injection extrusion molding test is performed on the sample by each of the examples and comparative examples and the results thereof are indicated in Table 3. The values for each test are an average value 5 times and the specimen obtained through the injection extrusion molding was a comparative object.

Injection temperature: Temperature inside injection machine upon performing injection extrusion molding (minimum temperature capable of performing a process that does not cause problems relating to non-molding, void, etc. based on molding product)

Nozzle temperature: Temperature immediately before molding product by injection machine comes from upon performing injection extrusion molding.

Cylinder 1, 2, 3: Temperature for each zone required to melt the elastomer for molding the thermoplastic elastomer.

Cycle time: Total time of injection for molding specimen 1 EA.

As shown in Table 3, it can be appreciated that the bio-friendly thermoplastic polyurethane elastomer composition (examples 1 and 2) including the hyper branch polyol(HBP) according to the present invention has superior injection extrusion molding as compared to the comparative examples.

TABLE 3

Injection Extrusion Molding Test Results

| Items | Example 1 | Example 2 | Comparative Example 1 | Comparative Example 2 | Comparative Example 3 | Comparative Example 4 | Comparative Example 5 |
|---|---|---|---|---|---|---|---|
| Nozzle Temp (° C.) | 230 | 230 | 220 | 220 | 225 | 225 | 220 |
| Cylinder 1 | 225 | 225 | 215 | 215 | 220 | 220 | 215 |
| Cylinder 2 | 220 | 220 | 210 | 210 | 215 | 215 | 210 |
| Cylinder 3 | 215 | 215 | 205 | 205 | 210 | 210 | 205 |
| Cycle Time (second) | 25 | 25 | 30 | 30 | 30 | 30 | 35 |

Another characteristic of the dendritic TPU disclosed herein is that the resilience of the material increases as hardness increases. This surprising result is in direct contradiction to the way convention TPU behaves, in that resilience decreases as hardness increases. Five different formulations of TPU materials made according to embodiments of the invention (Inventive Material 1, Inventive Material 2, Inventive Material 3, Inventive Material 4, and Inventive Material 5) were prepared with different hardness characteristics. Similarly, various formulations of conventional TPU materials (Conventional TPU 1, Conventional TPU 2, and Conventional TPU 3) were acquired and tested. The hardness of plaques of these materials was tested using ASTM 2240 (Shore D). The resilience of these materials was tested using ASTM D2632. The results of these tests are shown in Table 4. These results are also shown graphically in FIG. 8, with line 800 showing the response curve for the Inventive Materials and line 810 showing the response curve for the Conventional TPU.

TABLE 4

Resilience and Hardness for Select Materials

| | ASTM2240(ShoreD) | ASTM D2632(resilience %) |
|---|---|---|
| Inventive Material 1 | 48 | 41 |
| Inventive Material 2 | 53 | 43 |
| Inventive Material 3 | 56 | 47 |
| Inventive Material 4 | 58 | 53 |
| Inventive Material 5 | 60 | 50 |
| Conventional TPU 1 | 45 | 45 |
| Conventional TPU 2 | 55 | 40 |
| Conventional TPU 3 | 60 | 35 |

Figure 8:
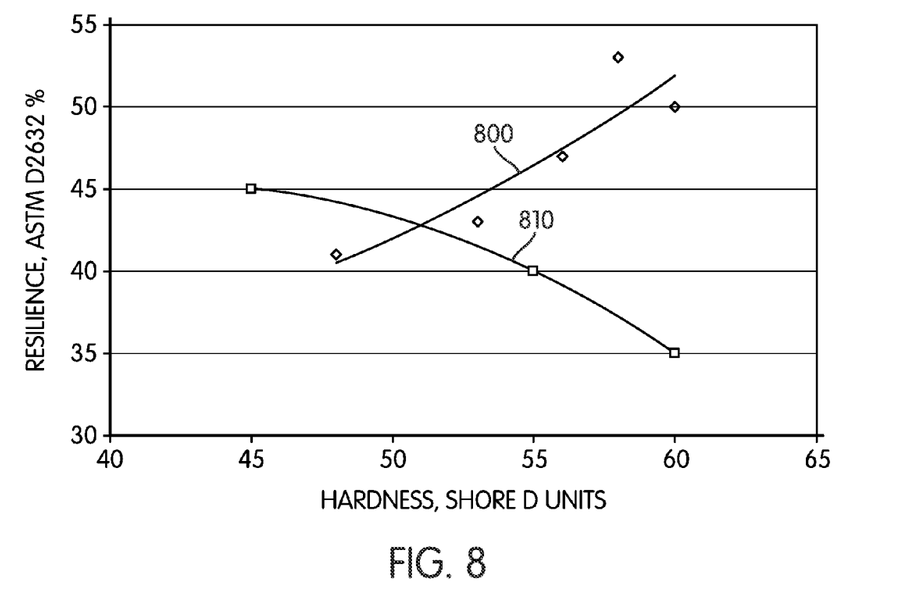
FIG. 8 is a schematic graphical representation of the resilience of a TPU material made in accordance with the invention versus hardness
Figure 9:
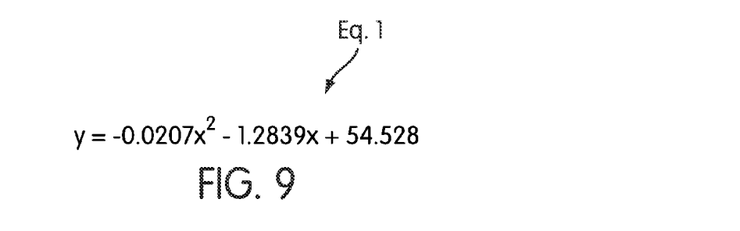
FIG. 9 is an equation showing the relationship of the resilience of various materials made in accordance with the invention with hardness.
Figure 10:
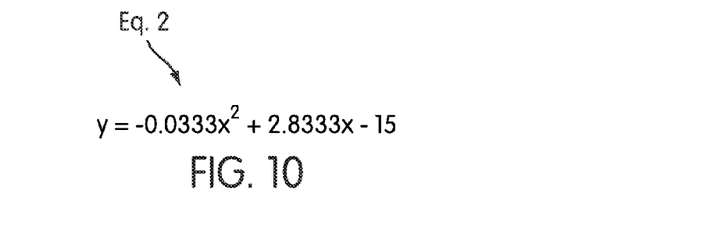
FIG. 10 is an equation showing the relationship of the resilience of conventional TPU materials with hardness.

As can be readily seen in Table 4 and FIG. 8, the surprising response of the Inventive Materials to increase resilience as the hardness increases is also readily observed in Table 4 and FIG. 8. The unexpected Inventive Materials response has been fitted to a curve described by first equation Eq. 1 shown in FIG. 9. Eq. 1 was developed by programming the data into an Excel® spreadsheet and generating the equation in Excel, which applies standard line-fitting techniques to fit the data. The error of Eq. 1, as represented by the coefficient of determination ($R^2$), is about 0.8137. The Conventional TPU materials show the expected response: to decrease resilience as the hardness increases. This response has been fitted to a line described by second equation Eq. 2 shown in FIG. 10. Eq. 2 was developed in the same way as Eq. 1. The error of Eq. 2, as represented by the coefficient of determination ($R^2$), is about 1. It is anticipated that any resilient material which has resilience and hardness characteristics that fit Eq. 2 could be incorporated into a golf ball for improved performance characteristics, not just the unique TPU formulations discussed herein.

The precise formulation mechanism for these surprising results is unknown. While not being bound by any particular theory, it is suspected that the use of hyper-branched polyols in the formulation of the Inventive Materials contributes to the resilience. Further, it is also suspected that the use of an ether-type polyol as opposed to the conventional use of ester-type polyols also contributes to the unexpected resilience response.

As is discussed throughout this description, solid golf balls incorporating the inventive materials, such as the hyper-branched polyol TPU materials and the resilient material whose resilience increases as hardness increases, may be made using any method known in the art. In some embodiments, the core layer or layers (inner core or first core layer, outer core or second core layer) is typically formed first, such as by compression molding or injection molding the core layer(s). The material may be cured, if necessary, using any method known in the art, such as in an oven or with UV light. The finished core layer(s) may be subjected to grinding, scoring, or other processes to prepare the core layer(s) to bond with the subsequent layers, even if no adhesive is used between the layers.

Any optional mantle layers are then formed to surround or substantially surround the core layer(s), such as by injection molding, overmolding, or compression molding the mantle layer(s) material. The material may be cured, if necessary, using any method known in the art, such as in an oven or with UV light. The finished mantle layer(s) may be subjected to grinding, scoring, or other processes to prepare the mantle layer(s) to bond with the subsequent layers, even if no adhesive is used between the layers.

Any cover layers (inner cover or outer cover layer) are then formed to substantially surround the core layer(s) and any optional mantle layer(s), such as by injection molding, overmolding, or compression molding the cover layer(s). The material may be cured, if necessary, using any method known in the art, such as in an oven or with UV light. The finished cover layer(s) may be subjected to grinding, scoring, or other processes to prepare the cover layer(s) to bond with the subsequent layers, even if no adhesive is used between the layers. The finished cover layer(s) may also be subjected to these processes to provide a more aesthetically pleasing appearance.

Finally, any coating layers are applied to the finished cover layer. Coating layers may include paint layers, protective coatings, indicia, or the like. The coating layers may be applied using any known technique, such as by spraying, dipping, printing such as pad printing and ink jet printing, painting, or the like. The coating layers are then cured, such as in an oven or with UV light.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of manufacturing a golf ball comprising:
forming a core layer, wherein the core layer is made from a first material;
forming a mantle layer, wherein the mantle layer substantially surrounds the core layer, and wherein the mantle layer is made from a second material;
forming a cover layer, wherein the cover layer substantially surrounds the core layer, and wherein the cover layer is made from a third material;
wherein the third material comprises a resilient material,
wherein the resilient material has a resilience value and a hardness value, and wherein the resilient material is thermoplastic polyurethane formed from one or more polyisocyanate monomers and one or more hyper branched polyols having a hydroxy valence of from about 2.1 to about 36, and wherein the resilient material is formed by curing the mixture to form a product;

wherein the method further comprises grinding the product at a temperature from about 0° C. to about 50° C. to form a ground product; and wherein forming the cover layer comprises extruding or injection molding the ground product.

2. The method of manufacturing a golf ball of claim 1, wherein the step of forming the core layer comprises compression molding.

3. The method of manufacturing a golf ball of claim 1, wherein the step of forming the cover layer comprises injection molding or extrusion molding.

4. The method of manufacturing a golf ball of claim 1, wherein the step of forming the mantle layer comprises injection molding.

5. The method of manufacturing a golf ball of claim 1, wherein a relationship between the resilience value and the hardness value is expressed by an equation, wherein the equation is $y=-0.0207x^2-1.2839x+54.528$, where y represents the resilience value in ASTM D2632 percentage and x represents the hardness value in Shore D units, and wherein the square of the correlation coefficient of the equation is about 0.81.

6. The method of manufacturing a golf ball of claim 1, wherein the hyper branched polyol has a hydroxy valence of from about 12 to about 36.

7. The method of manufacturing a golf ball of claim 1, wherein the thermoplastic polyurethane formed from the one or more polyisocyanate monomers and the one or more hyper branched polyols having a hydroxy valence of from about 2.1 to about 36 is further formed from one or more additional polyols.

8. The method of manufacturing a golf ball of claim 1, wherein the thermoplastic polyurethane formed from the one or more polyisocyanate monomers and the one or more hyper branched polyols having a hydroxy valence of from about 2.1 to about 36 is further formed from one or more chain extenders.

9. The method of manufacturing a golf ball of claim 1, wherein the thermoplastic polyurethane is formed from, based on a total reaction mixture, from about 15 to about 60 parts by weight of the one or more polyisocyanate monomers, from about 0.1 to about 10 parts by weight of the one or more hyper branched polyols, from about 30 to about 70 parts by weight of optional one or more bio-renewable polyether polyols, and from about 10 to about 40 parts by weight of optional one or more chain extenders.

* * * * *